United States Patent [19]

Garin et al.

[11] Patent Number: 4,712,973
[45] Date of Patent: Dec. 15, 1987

[54] TWO SERVO AXIS, AC POWERED ROBOT WRIST

[75] Inventors: John Garin, Birmingham; Allan J. Riggs, Ann Arbor, both of Mich.; Robert S. Palmer, Penn Hills, Pa.

[73] Assignee: Westinghouse Electric Corp., Pittsburgh, Pa.

[21] Appl. No.: 863,483

[22] Filed: May 15, 1986

[51] Int. Cl.⁴ .............................................. B25J 17/02
[52] U.S. Cl. .................................. 414/744 A; 310/83; 310/89; 901/23; 901/29
[58] Field of Search ............. 414/735, 744 A; 901/18, 901/23, 24, 27, 28, 29, 38; 310/83, 89, 90; 384/490, 513, 516

[56] References Cited

U.S. PATENT DOCUMENTS 4,185,215 1/1980 Montagu .............................. 310/83
4,196,947 4/1980 Ziegler .............................. 384/615 X
4,576,544 3/1986 Passemard et al. ................. 414/735
4,637,771 1/1987 Yasukawa .......................... 901/23 X
4,651,591 3/1987 Wurst ................................ 901/28 X Primary Examiner—Robert J. Spar
Assistant Examiner—Donald W. Underwood
Attorney, Agent, or Firm—B. R. Studebaker

[57] ABSTRACT

The wrist includes a first frameless permanent magnet AC powered motor 22 in a first housing 12 with this motor providing movement of a rack 34 along a translational axis A1 with a second frameless permanent magnet motor 42 carried in a second housing 18 connected to the carriage 16 of which the rack 34 is a part so that the housing 18 is movable along an insertion or translation axis A1 with the second motor 42 providing a rotary output. Both of the motors are AC powered and the rotors thereof are each supported solely by a single X type bearing 28 and 48.

5 Claims, 4 Drawing Figures

4,712,973

TWO SERVO AXIS, AC POWERED ROBOT WRIST

BACKGROUND OF THE INVENTION

This invention pertains to a two axis electrically powered robot wrist.

One particular type of robot having two jointed links pivoting about parallel vertical axes is illustrated in U.S. Pat. No. 4,392,776 assigned to Westinghouse Electric Corporation. U.S. patent application Ser. No. 635,375 filed July 27, 1984, now abandoned, and continuation application Ser. No. 892,890, filed July 29, 1986 which is assigned to Westinghouse Electric Corporation, discloses an improved drive system for that general type of robot. Neither the patent nor the application treat in any detail the particular type of wrist carried by the second arm of the devices. However in the commercial version of the device the end effector carried by the wrist has rotary motion imparted to it through a gearing arrangement driven by a DC motor in the second arm, while translational motion of the end effector is accomplished through a pneumatic drive.

The present invention, which has as its assignee the wholly-owned subsidiary of Westinghouse Electric Corporation, is intended to provide an improvement of the previous wrist in a number of respects which will be noted hereinafter.

SUMMARY OF THE INVENTION

The two axis wrist according to the invention is mounted at the end of the second manipulator arm and comprises first and second hollow housings and first and second frameless permanent magnet AC motors mounted in the respective housings, with the first motor driving a carriage through a rack and pinion arrangement to provide translational motion of the carriage, with the second housing attached to one end of the carriage, and the second housing having a frameless permanent magnet AC motor providing a rotary output for use by whatever end effector is used.

DRAWING DESCRIPTION

DESCRIPTION OF THE PREFERRED EMBODIMENT

Figure 1:
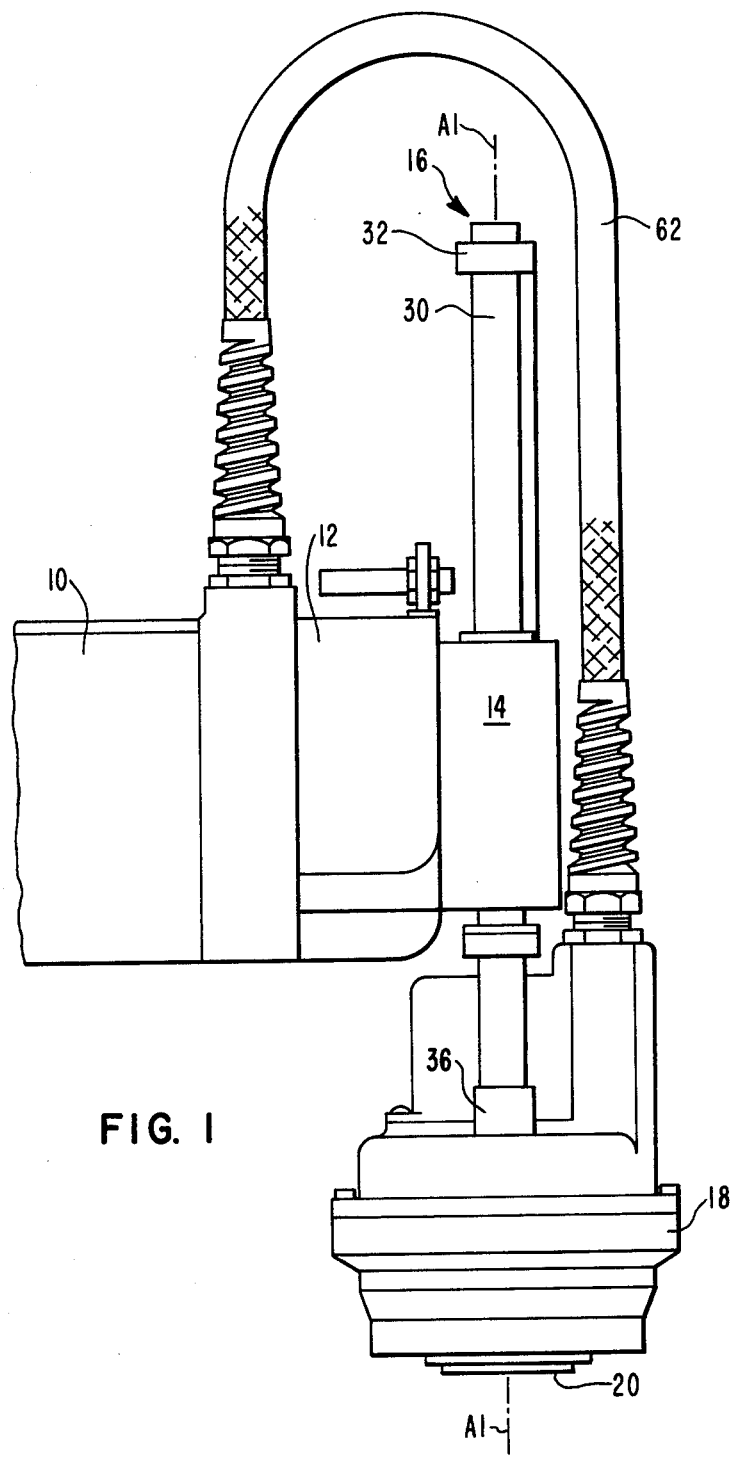
FIG. 1 is a side view of a wrist arrangement according to the invention mounted at the end of a secondary arm.

Referring to FIG. 1, the general overall scheme of the wrist arrangement of the invention is shown. The end 10 of a secondary arm for a robot of the general type described in the noted patent and application, for example, has a first hollow housing 12 attached thereto. This first housing has a bracket 14 attached to its distal end which receives a carriage, generally designated 16, which is capable of vertical movement relative to the bracket 14 in a manner which will be later described. The carriage has a second housing 18 attached to its lower end which contains means to be later described and which provides a rotary output of a tool plate or the like 20 at the bottom end of the housing. The vertical motion of the carriage and second housing is motion along a translational axis which in robot parlance is sometimes called the insertion axis. The rotary motion of the tool plate 20 is about the same axis. Thus, while there is a single axis, there is translational motion therealong, as well as rotary motion therearound, this single axis being designated as A1.

Figure 2:
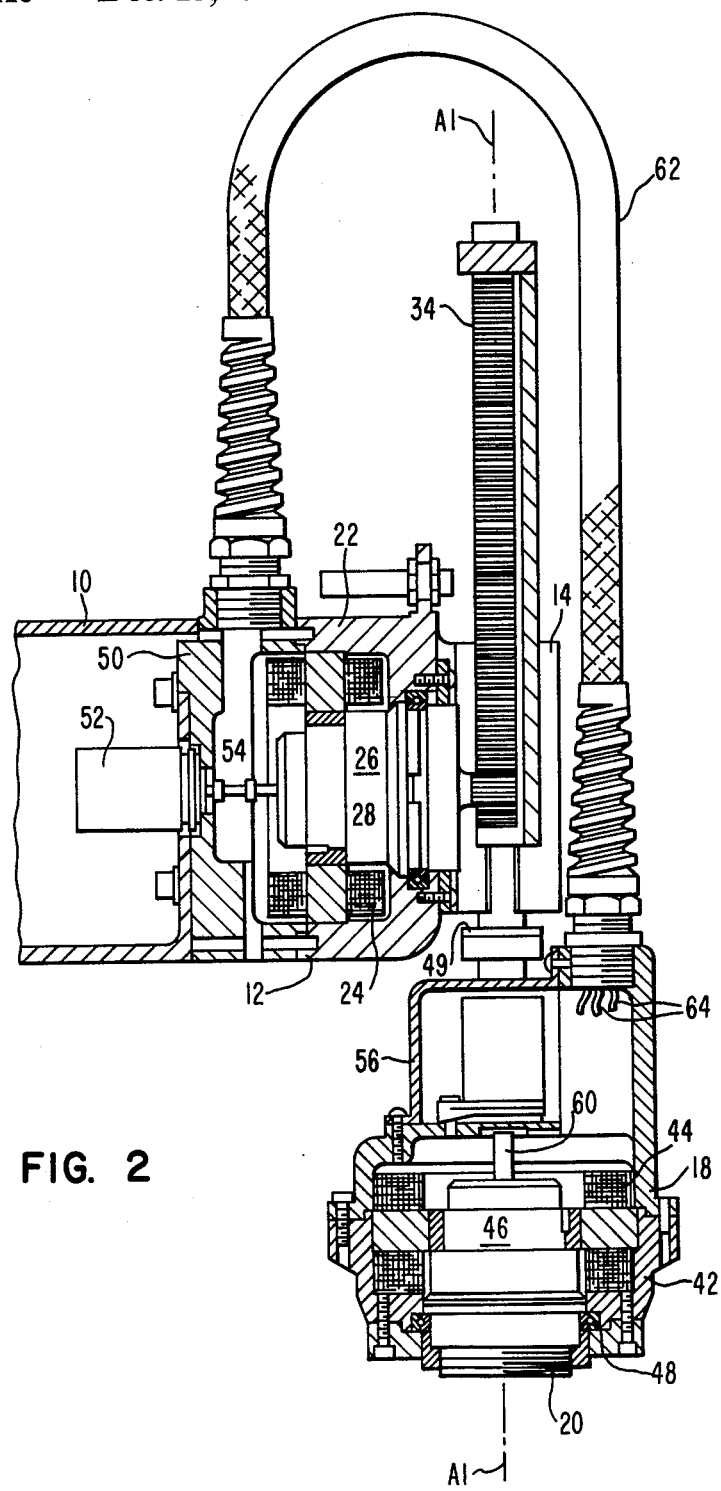
FIG. 2 is a sectional view of the wrist of FIG. 1.
Figure 3:
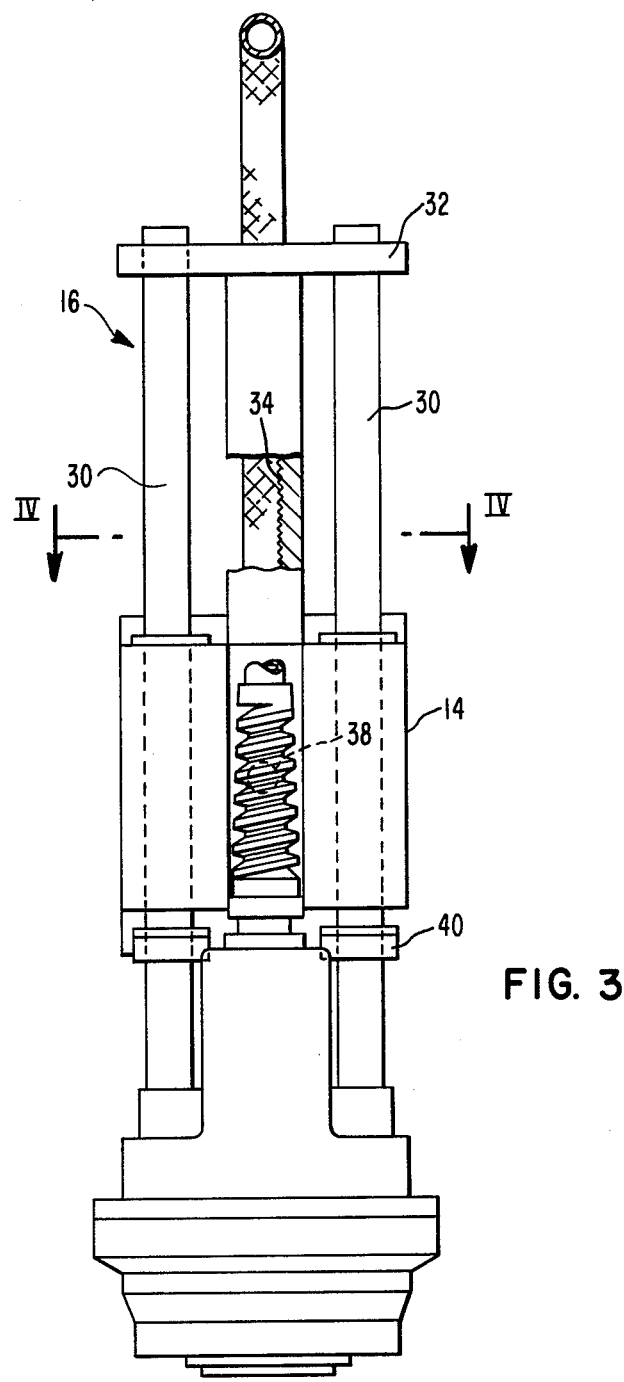
FIG. 3 is a partly broken end view of the wrist.
Figure 4:
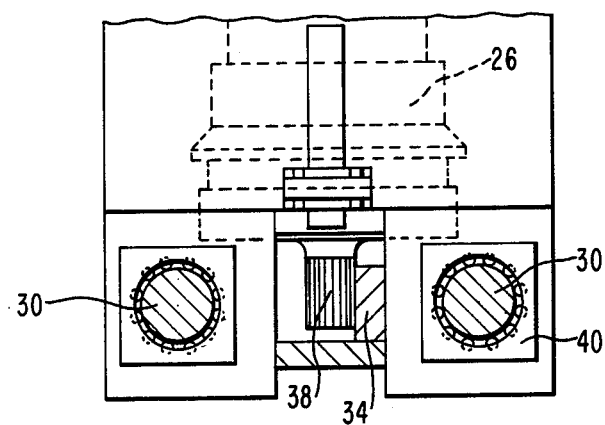
FIG. 4 is a horizontal sectional view corresponding to one taken along the line IV—IV of FIG. 1.

Referring to FIGS. 2-4 for a detailed description of the wrist arrangement, the first hollow housing 12 is preferably of a lightweight cast material such as aluminum conformed as cast to provide a seat for the first electric motor generally designated 22. This motor is a permanent magnet AC powered motor, preferably of the rare-earth type, and includes the stator 24 and the rotor 26. The motor is frameless until it is received within the housing 12 which functions as the frame for the stator 24. The rotor is supported from a single X or four-way contact bearing 28.

The bracket 14, affixed to the open end of the first housing 12, receives the carriage generally designated 16 for reciprocating vertical motion along the insertion axis. The carriage includes guide means in the form of a pair of ground and hardened shafts 30 (FIGS. 2-4) connected at their upper ends to the plate 32, a vertical rack gear 34 (split to allow for backlash adjustment) also connected to the plate 32, and with the lower end of the carriage in the form of the lower ends of the shafts 30 being attached to the second housing 18 as at 36. The shafts are journalled by linear ball bearings 35 carried by bracket 14 (FIG. 4). A pinion gear 38 driven by the rotor 26 meshes with the rack 34 to impart the translational motion to the carriage 16. End of travel stops with absorbent bumpers 40 on the guide shafts provide overtravel protection for the carriage in its movement in translational fashion.

The second housing 18 is also preferably cast of a lightweight material, with a slightly different configuration than that of the first housing 12, and it similarly receives a second frameless permanent magnet AC powered motor generally designated 42 and including stator 44 and rotor 46. Again the rotor is supported by a single X type or four-way contact bearing 48. The main output end 20 of the rotor is adapted to receive a tool plate or end effector.

End portion 10 of the secondary arm is at least partly open ended and means 50 are provided to support a first resolver 52 connected through flexible coupling 54 to the first rotor 26 to provide translational position information. The resolver 52 is thus protected against damage by impact.

The second housing 18 is provided with a cover part 56 to similarly aid in protecting the second resolver 58 connected to the second rotor 46 through the flexible coupling 60. A flexible electrical conduit 62 carries motor and resolver electrical leads generally designated 64 from the first housing and the secondary arm end portion so that throughout the extent of their passage from the end portion and through the wrist the leads are protected from the environment.

Among the perceived advantages and improvements with respect to certain known prior art practices are the following. The rotary motion from the second motor is direct drive and it has continuous rotation capability with no backlash inducing drive components. The use of the rack and pinion drive permits the selection of available precision components. The translation movement of the guide shafts through linear ball bearings results in a low friction, smooth operation. Since the motors are frameless with the housings performing this function, a reduced weight arrangement is provided.

The AC power of the motors gives a significant improvement in power/weight ratio versus the current DC powered wrist. The translation axis arrangement permits for readily scalable different stroke lengths along the translation axis. The use of the single X bearings reduces parts and simplifies machining and alignment problems. In general, many of the parts for the wrist are commercially available components so that costs of parts is reduced.

Also the translational axis is sized to permit indexes under full servo control at rates significantly higher than the present pneumatically driven axis.

The rotational axis is capable of being torque servoed at low speeds, making it suitable for tasks such as rut running or screw driving. Also it can be run at high rates of speeds (up to 4000 RPM). Thus, it is suitable (with the appropriate chuck) of functioning as a drill. Since no additional drill motor with its attendant weight must be added, much higher hit rates are possible.

We claim:

1. A two axis wrist mounted at the end of an at least partly open-ended manipulator arm, comprising:
   a substantially hollow first housing mounted to said arm end;
   a first frameless permanent magnet AC motor mounted in said housing and having a rotor with its axis parallel to the axis of said arm;
   an assembly mounted to the distal end of said first housing, said assembly including a bracket fixed to said housing and a carriage having opposite ends with guide means extending therebetween, said guide means being slidably received by said bracket for guiding said carriage in movement transverse to said arm axis;
   said carriage including a rack gear disposed in parallel relation to said guide means and attached to at least one opposite end of said carriage, and a pinion meshing with said rack and driven by said first motor rotor to provide translational motion to said carriage;
   a second substantially hollow housing having one end thereof attached to one end of said carriage and disposed with its axis transverse to said arm axis;
   a second frameless permanent magnet motor mounted in said second housing adjacent the second housing end opposite to said second housing one end, said second motor including a stator, and a rotor providing a rotary output at said second housing opposite end to provide rotary motion of a tool at said opposite end of said second housing.

2. A wrist according to claim 1 including:
   a single X type bearing providing the sole support in each housing for each rotor.

3. A wrist according to claim 1 including:
   said bracket carries linear ball bearing means associated with said guide means to provide low friction, smooth translation of said guide means relative to said bracket.

4. A wrist according to claim 1 including:
   resolver means disposed in the hollow interior of said arm and connected to said first rotor.

5. A wrist according to claim 1 including:
   second resolver means in said second housing in the interior space adjacent said one end portion of said second housing.

* * * * *